United States Patent Office 2,907,466
Patented Oct. 6, 1959

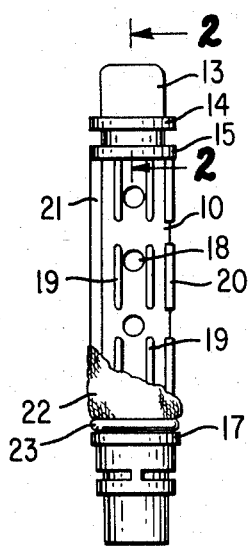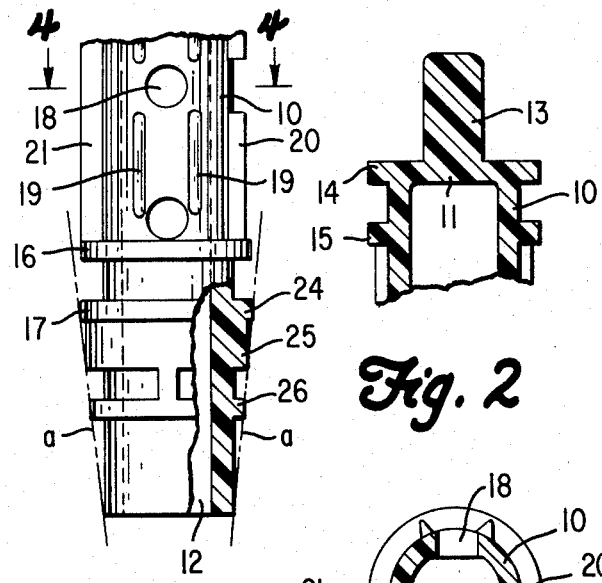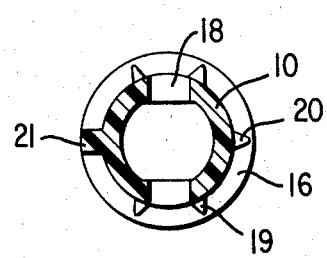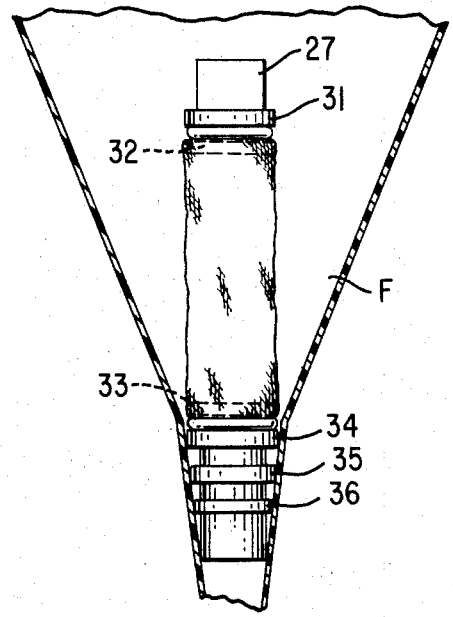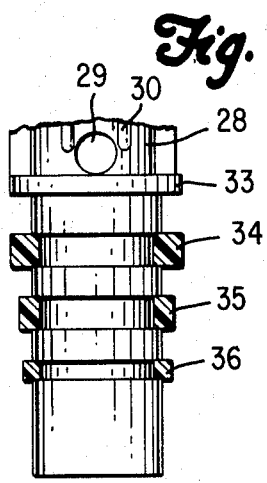

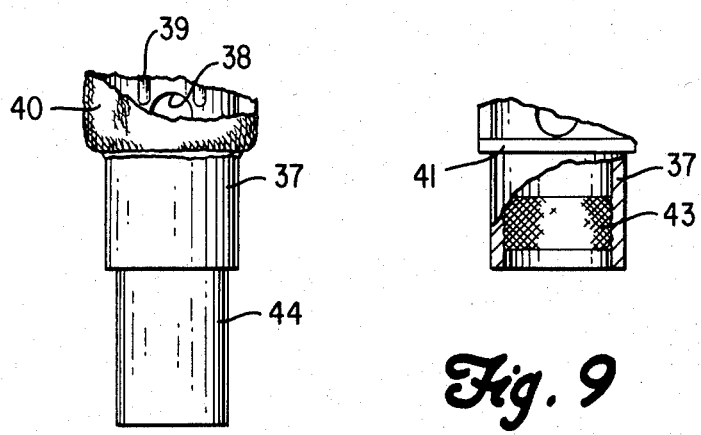
Fig. 7
Fig. 9
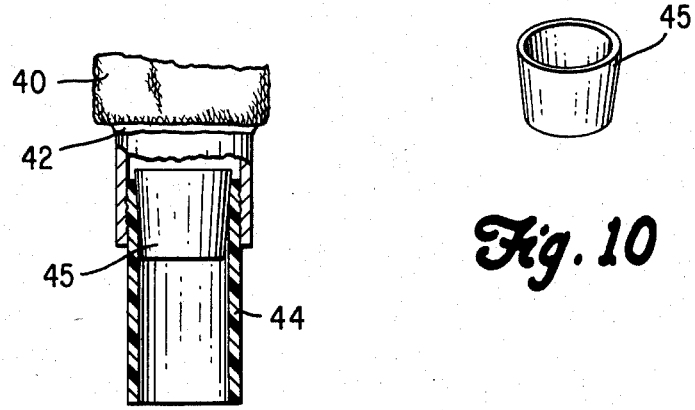
Fig. 8
Fig. 10
INVENTOR.
RAYMOND R. BEDDOW
ATTORNEY

2,907,466

REMOVABLE FILTER DEVICE FOR FUNNELS

Raymond R. Beddow, Toledo, Ohio

Application May 8, 1957, Serial No. 657,856

2 Claims. (Cl. 210—457)

This invention relates to a filtering device for use with funnels to enable liquid poured into the funnel to be filtered, but more particularly to relatively small funnels such as used in connection with appliances, outboard motors and the like.

An object is to produce a new and improved filter device or cartridge of the above type which can be readily and conveniently applied to and removed from the funnels and when in place effectively seals the funnel spout requiring the liquid to pass through the filter cartridge; is sturdy and reliable in construction; is capable of filtering a relatively large volume of liquid within a short period of time; and is so designed that it can be manufactured economically on a quantity production basis.

Other objects and advantages of the invention will hereinafter appear and for purposes of illustration but not of limitation, embodiments of the invention are shown on the accompanying drawings in which:

Figure 1 is a side elevation with parts broken away showing the filtering cartridge for a funnel, the same being adapted to be produced by molded plastic so far as the body is concerned;

Figure 2 is a fragmentary sectional view on an enlarged scale on the line 2—2 of Figure 1;

Figure 3 is an enlarged fragmentary lower end elevation partly in section of the cartridge shown on Figure 1, the filter cloth and anchoring ring being omitted;

Figure 4 is a transverse sectional view on the line 4—4 of Figure 3;

Figure 5 is a side elevation of an alternate form of cartridge showing the same positioned within a funnel;

Figure 6 is an enlarged fragmentary view of the lower end of the cartridge shown in Figure 6, certain parts being omitted for purposes of clarity;

Figure 7 is a fragmentary view of another alternate form of cartridge in which the tubular body is of metal and a plastic tube is telescoped into the discharge end thereof;

Figure 8 is a fragmentary longitudinal section of the structure shown in Figure 7;

Figure 9 is a fragmentary view similar to Figure 8 with the plastic tube and filter sleeve removed; and Figure 10 is a perspective view of the wedge member which secures the plastic tube within the metal body.

The filter cartridge shown on Figures 1 to 4 is in the main produced from a single mold and of plastic material, such for example as polyethylene. As shown, the body consists of an elongate barrel 10 of generally cylindrical form having a closed upper end 11 and an open lower end 12. Projecting upwardly from the closed upper end 11 is an extension 13 which has flat parallel sides and provides a finger hold for inserting the cartridge into and removing it from the funnel body. At the upper end of the body is an integral, laterally extending annular flange 14 and spaced below it is a similar flange 15, these flanges being spaced from each other to provide a groove into which the end of the filter screen is placed and anchored as will hereinafter appear. Similarly at the lower end portion of the body 10 is radially extending annular flange 16 and below it and spaced therefrom is a similar integral flange 17, the space between these two flanges similarly providing a place to receive the lower end portion of the filter screen as will hereinafter appear.

Formed in the body 10 between the flanges 15 and 16 are two rows of diametrically opposed holes 18 to enable liquid from the body of the funnel to pass into the bore of the cartridge and then downwardly to the spout through the open lower end 12 of the body, the liquid being filtered by passing through a relatively fine mesh filter cloth which entirely encloses the body between the flanges 15 and 16. It will be observed that on opposite sides of the rows of holes 18 are a series of aligned ribs 19, each of the ribs being chamfered on the side adjacent the respective hole to facilitate the flow of liquid therethrough. It will be noted that adjacent ribs 19 are spaced slightly from each other, thus enabling adequate movement of the liquid from the inside of the funnel to the holes 18.

Intermediate one pair of rows of ribs 19 is a row 20 of ribs which project outwardly from the body 10, and as shown in Figure 4 these ribs are pointed at their outer ends. Diametrically opposed to the series of ribs 20 is a rib 21 which extends from the annular flange 15 in an unbroken manner to the lower flange 16 embracing the body of the cartridge and spaced from the outer wall of the body 10 by the ribs 19, 20 and 21 is a metallic filter cloth of suitable mesh which is wrapped around and suitably seamed along the unbroken rib 21, thereby to cause all the liquid from the body of the funnel to flow through the screen and enter the bore of the body through the holes 18. The opposite ends of the sleeve thus formed by the filter cloth are crowded into the spaces between the flanges 14 and 15 at the upper end and the flanges 16 and 17 at the lower end. It will be observed that the edges of the flanges 16 and 17 are square so that the metallic filter screen can imbed itself into the plastic flanges and thereby militate against any of the liquid passing in a manner other than that desired. The ends of the sleeve are securely anchored by retaining rings 23 which engage respectively inthe space between the flanges 16 and 17 and the flanges 14 and 15.

As generally indicated on Figure 5, it will be understood that the filter cartridge is forced into the throat or spout of the funnel and it is important that an effective liquid seal is effected between the cartridge and the throat to prevent liquid from passing down through the throat without passing through the filter. For this purpose a series of integral annular flanges 24, 25 and 26 which are spaced axially from each other are formed at the lower end portion of the body. These flanges are of gradually decreasing external diameter as indicated by the broken line A so that these surfaces may wedge tightly into the throat of the funnel and provide the desired seal. It will be noted that the flange 26 is spaced substantially from the lower end of the cartridge which has the same diameter as the diameter of the body 10. In the alternate form of the invention shown on Figures 5 and 6, the body 10 is formed from sheet metal suitably stamped and then formed into a tube and suitably seamed. The upper end of the tube body is closed by a plastic cap 27 which serves as a finger hold as above described. Holes 29 are similarly formed in the body and integral ribs 30 pressed outwardly from the body serve for the same purpose as the ribs 19 above described. Other ribs similar to the ribs 20 and 21 are also provided so that the filter screen sleeve is similarly mounted in position. The upper end of the body adjacent the plastic closure cap 27 is a metallic ring 31 and spaced therefrom and engaging in an annular groove formed in the body is a plastic ring 32 over which the filter screen is forced and anchored into place in the manner above described. At the lower end of the end portion of the body is a plastic ring 33 over which the lower end of the filter screen sleeve is crowded. At the lower end portion and fitting in suitable grooves formed in the metallic body are plastic rings 34, 35 and 36 of gradually decreasing external diameter to seal in the throat of the funnel indicated generally at F on Figure 5, thereby to effect the desired seal between the cartridge and the funnel structure.

Figures 7 to 10 illustrate another alternate form in which the cylindrical body 37 is of sheet metal similar to the form shown on Figures 5 and 6. In this form the structure is virtually the same as that shown on Figures 5 and 6 except for changes in the discharge end portion of the device. It will be observed that the body 37 is similarly provided with a series of holes and in the region of the holes and otherwise are ribs 39 over which fits a metallic filter screen sleeve 40 which at opposite ends extends over an annular rib integrally formed in and projecting outwardly from the body 37. The end portions of the sleeve may be preliminarily held by a spring band temporarily to retain them in place and then the entire unit is soldered so that the screen sleeve is soldered to the outside of the body 37.

On the inside of the metallic cylinder 37 adjacent the lower or discharged end is knurling 43 extending completely around the inside of the body 37. The area of knurling may be varied as desired and instead of knurling longitudinal ridges or the like may be employed. The purpose of the knurling or roughened portion on the inside of the cylindrical body 37 is to imbed the portion of the plastic tube 44 which telescopes inside of the body 37. The tube 44 may be of polyethylene and has a relatively close fit with the inside of the tube and as shown it projects well inside of the tube. For securing the tube 44 within the body 37 a frusto-conical wedge member 45 which may be of sheet metal or the like is forced from the inside of the tubular body 37 to press the inner edge portion of the plastic tube 44 into intimate engagement with the knurling 43, thereby imbedding a portion of the tube 45 into the knurling and securely retaining the plastic tube in place to resist torsional strains which would tend to loosen the tube 44 from the tube 37 and also from the longitudinal strains. In this maner and by this simple expedient, the tube 44 is securely retained within the tube 37.

It will be observed that a substantial portion of the tube 44 projects out beyond the end of the cylindrical body 37 and is for insertion into the throat of the funnel. Since the tube 44 is of plastic, it can be compressed to form a satisfactory seal with the throat of the funnel.

From the above description it will be seen that I have produced a funnel filter of extreme simplicity and one which will satisfactorily and quickly filter a large volume of liquid. It can be easily installed in a liquid tight manner in the funnel throat and, when the filtering operation is completed, it can be readily removed and easily cleaned and stored. The number of parts has been kept to a minimum, thereby enabling the same to be produced inexpensively on a quantity production basis.

Numerous changes in details of construction, arrangement and choice of materials may be effected without departing from the spirit of the invention, especially as defined in the appended claims.

What I claim is:

1. A filter device for funnels comprising an elongate cylindrical body of relatively soft plastic material closed at one end and open at the opposite end and provided with a plurality of perforations, an integral projection extending from the closed end of said body providing a fingerhold to facilitate insertion and removal of the body relative to a funnel, a plurality of integral ribs on said body projecting radially therefrom, said ribs being spaced from one another both laterally and axially providing fluid passageways therebetween, a pair of axially spaced integral rings adjacent each end portion of said body providing an annular groove therebetween, a sleeve of metallic filter cloth material fitting said body and bearing against said ribs, opposite ends of said sleeve being crowded into said annular groove, and a ring securing each end of said sleeve in the respective groove and embedding the respective sleeve portion into the plastic material.

2. A filter device for funnels as defined in claim 1 wherein the exposed edges of said axially spaced integral rings are square to thereby enable said filter cloth material to embed itself therein.

References Cited in the file of this patent

UNITED STATES PATENTS

| | | |
|---|---|---|
| 324,080 | Butterfield | Aug. 11, 1885 |
| 729,835 | Barnes | June 2, 1903 |
| 953,124 | Conradson | Mar. 29, 1910 |
| 1,677,118 | Ford | July 10, 1928 |
| 2,548,965 | Gangler | Apr. 17, 1951 |

FOREIGN PATENTS

| | | |
|---|---|---|
| 524,500 | Belgium | Dec. 15, 1953 |